United States Patent
Weber et al.

(10) Patent No.: US 11,777,357 B2
(45) Date of Patent: Oct. 3, 2023

(54) ELECTRIC MACHINE AND METHOD FOR MAKING ELECTRICAL CONTACT WITH A WINDING OF AN ELECTRIC MACHINE

(71) Applicant: AUDI AG, Ingolstadt (DE)

(72) Inventors: Korbinian Weber, Ingolstadt (DE); Patrick Herrmann, Pfaffenhofen a.d. Ilm (DE)

(73) Assignee: Audi AG, Ingolstadt (DE)

( * ) Notice: Subject to any disclaimer, the term of this patent is extended or adjusted under 35 U.S.C. 154(b) by 302 days.

(21) Appl. No.: 17/116,909

(22) Filed: Dec. 9, 2020

(65) Prior Publication Data

US 2021/0175766 A1 Jun. 10, 2021

(30) Foreign Application Priority Data

Dec. 10, 2019 (DE) .......................... 102019133674.0

(51) Int. Cl.
  *H02K 3/50* (2006.01)
  *B60K 1/00* (2006.01)
  *H02K 15/00* (2006.01)
(52) U.S. Cl.
  CPC ................. *H02K 3/50* (2013.01); *B60K 1/00* (2013.01); *H02K 15/0062* (2013.01)
(58) Field of Classification Search
  CPC .......... H02K 3/505; H02K 3/522; H02K 3/50; H02K 3/18; H02K 3/28; H02K 15/12;
  (Continued)

(56) References Cited

U.S. PATENT DOCUMENTS

| 2014/0210298 A1* | 7/2014 | Tamura | H02K 3/12 310/198 |
| 2018/0278113 A1* | 9/2018 | Asahi | H02K 5/24 |
| 2019/0315031 A1 | 10/2019 | Asahi et al. | |

FOREIGN PATENT DOCUMENTS

| CN | 109391052 A | 2/2019 | |
| CN | 109586468 A * | 4/2019 | H02K 15/0068 |

(Continued)

OTHER PUBLICATIONS

CN-109586468-A machine translation Dec. 3, 2022.*
JP-2019103354-A machine translation Dec. 3, 2022.*

*Primary Examiner* — Leda T Pham
(74) *Attorney, Agent, or Firm* — SEED INTELLECTUAL PROPERTY LAW GROUP LLP

(57) ABSTRACT

An electric machine comprises a rotor and a stator, wherein the stator comprises a stator body which carries at least one respective winding of at least one phase, wherein the winding of the respective phase or at least one of the windings of the respective phase is conductively connected to a respective contact bridge, which connects the respective winding to an associated power source and/or drain, wherein the respective winding and the contact bridge connected to it each end in a conductor section which extends away from the stator body in the axial direction of the electric machine, these conductor sections being conductively connected to one another, wherein a fixing section of the respective contact bridge is arranged stationary with respect to a housing accommodating the stator by being fixed by an insulation element or directly, on the one hand, to the housing itself and/or, on the other hand, to the power source and/or drain, which, in turn, is fixed to the housing.

10 Claims, 2 Drawing Sheets

(58) Field of Classification Search
CPC .............. H02K 5/225; H02K 15/0062; H02K 15/0068; B60K 1/00
See application file for complete search history.

(56) References Cited

FOREIGN PATENT DOCUMENTS

| | | |
|---|---|---|
| DE | 11 2010 006 096 T5 | 3/2014 |
| DE | 10 2017 209 931 A1 | 12/2018 |
| DE | 20 2018 006 090 U1 | 3/2019 |
| JP | 2019103354 A * | 6/2019 |

* cited by examiner

ELECTRIC MACHINE AND METHOD FOR MAKING ELECTRICAL CONTACT WITH A WINDING OF AN ELECTRIC MACHINE

BACKGROUND

Technical Field

Embodiments of the invention relate to an electric machine, comprising a rotor and a stator, wherein the stator comprises a stator body which carries at least one respective winding of at least one phase, wherein the winding of the respective phase or at least one of the windings of the respective phase is conductively connected to a respective contact bridge, which connects the respective winding to an associated power source and/or drain. In addition, embodiments of the invention relate to a motor vehicle and a method for electrical contacting of at least one winding of at least one phase of a stator of an electric machine.

Description of the Related Art

One way of applying windings to a stator of an electric machine, which is increasingly used in the automotive sector in particular, is the so-called hairpin design, in which a mostly rectangular profile wire is bent into a U-shape, that is to say in the form of a hairpin, whereafter the legs of this hairpin are arranged circularly and are inserted in slots of a stator body, that is to say in particular of a stator laminated core. In the next step, the open pin ends on the back of the stator body can be rotated concentrically to the stator axis by a defined angle. In particular, all pin ends are bent to a diameter in the same direction in the circumferential direction and in successive layers in the radial direction in different directions. This process is also referred to as "twisting". As a result, free ends of different pins come to lie next to one another and can be welded together in order to form windings of the stator. Depending on the winding scheme, so-called interconnection bridges can be placed on the winding head and welded to the pin ends in order to interconnect the individual conductor sections to form an overall winding. In order to complete the stator, the pin ends can be isolated and the entire stator can be impregnated.

The advantages of the technology described are the high degree of automation and a high copper fill factor in the stator slot. Other common winding techniques for profile wires are, for example, wave windings or single-tooth windings.

In order to connect the windings or phases with a power source or drain, for example with an inverter for motor operation or a rectifier for generator operation, contact bridges are welded to the windings, which are connected to contact elements of a power source or drain as part of the assembly of the electric machine. A possible approach for this purpose can be found in document DE 20 2018 006 090 U1, for example.

The problem here is that both the winding process and the installation of the stator in a housing of the electric machine are processes in which certain component variations or tolerances occur. Since stator production comprises a large number of production steps, total tolerances of a few tenths of a millimeter or even a millimeter or more can occur in all spatial axes, but especially in the axial direction of the electric machine. These tolerances are compensated by a deformation of the winding and/or the contact bridge and/or the connections of the power electronics. Due to the relatively rigid connected elements and due to additional loads due to vibrations or oscillations, thermal alternating cycles, etc., the guide elements, which can be made of copper, for example, or joints between them can be damaged in the long term. As a result, the service life of the electric machine can be significantly reduced.

BRIEF SUMMARY

Embodiments of the invention are thus based on the object to provide an improved electric machine that particularly reduces a strain of components that may lead to a reduction in service time of the electric machine.

The object may be achieved by an electric machine of the type mentioned above, wherein the respective winding and the contact bridge connected to it each end in a conductor section which extends away from the stator body in the axial direction of the electric machine, wherein these conductor sections are conductively connected with one another, wherein a fixing section of the respective contact bridge is stationarily arranged relative to a housing accommodating the stator by being fixed via an insulation element or directly, on the one hand, to the housing itself and/or, on the other hand, to the power source and/or drain which, in turn, is fixed to the housing.

Since the connection of the winding and contact bridge is made via conductor sections that both extend away from the stator body in the axial direction of the electric machine, tolerance compensation in the axial direction can take place within the context of the manufacture of the electric machine by being able to freely choose the relative position of the conductor sections in the axial direction within certain limits without interfering with their connection. This makes it possible, in particular in the context of manufacture, to initially determine the position of the contact bridge with respect to the housing or the current source and/or drain and only then to establish the conductive connection. This makes it possible to compensate tolerances in the axial direction of the electric machine essentially completely. In this way, the strain in the components explained at the beginning is at least largely avoided and the load on the components or their connections can be reduced considerably. This allows to extend the service life of the electric machine.

The conductor sections of the contact bridge and the winding can in particular be connected form-fittingly, in particular welded or soldered. Fixing the contact bridge or the insulation element to the housing or the power source and/or drain and/or fixing the contact bridge to the insulation element can in particular take place force- or form-fittingly. For example, these components can be screwed together. Specifically, the contact bridge or the insulation element can have a through hole, through which a fixing means, in particular a screw, passes, bracing the contact bridge or the insulation element to the housing or the power source and/or drain. The contact bridge or its fixing section and the insulation element can be screwed, latched or glued together, for example. The contact bridge or its fixing section can also be partially cast into the insulation element.

The current source or drain is in particular a power converter. In particular, it can be an inverter or rectifier. The converter can be operated as an inverter and as a rectifier, for example to enable a motor and generator operation as required.

The housing can encompass the stator completely or at least in sections in the circumferential direction. The housing may extend in the axial direction beyond the stator body and in particular also beyond the winding heads of the winding. As will be explained below, however, the conductor sections can protrude axially beyond the housing in order to facilitate the production of the conductive connection or other processing steps.

The use of the insulation element is particularly expedient if a conductive housing is used in order to avoid short-circuiting different contact bridges. The insulation element can consist of any desired insulator, e.g., plastic or ceramic. As an alternative to the use of a separate insulation element, a housing can be utilized, that at least in sections consists of insulation material and is coated with an insulator or the like.

At least one section of the contact bridge can abut at least one respective contact surface of the housing and/or the insulation element and/or be accommodated in a recess of the housing and/or of the insulation element. This makes it easier to set the position of the contact bridge with respect to the housing in the context of the manufacture of the electric machine before the conductive connection between the conductor sections is established. In particular, a stationary arrangement at the housing can thus already take place before the fixing section or the insulation element is fixed to the housing or the power source and/or drain.

By abutting the contact surface, a stop or a guide at the housing or at the insulation element is achieved, by means of which the degrees of freedom of movement of the contact bridge with respect to the housing can be restricted in the course of manufacture even before fixing. The section that abuts the contact surface or is received in the recess, can be in particular the fixing section and/or an intermediate section between the fixing section and the conductor section, which is connected to the conductor section of the winding. If the section is accommodated in a recess of the housing or the insulation element, it can accommodate the section in a form-fitting manner or at least guide it in one direction. In this way, the determination of the relative position of the contact bridge and the housing can be improved even before the fixing.

The conductor section of the respective winding can extend in the axial direction through an opening in the housing and/or the insulation element and be conductively connected to the conductor section of the respective contact bridge on the side of the opening facing away from the stator body. The dimensions of the opening can be selected in such a way that the opening guides the conductor section of the respective winding in the circumferential direction and/or in the radial direction. In particular, if the opening has a sufficient length in the axial direction, the position of the conductor section of the respective winding with respect to the housing in the circumferential and/or radial direction can thus be determined with high accuracy. Tolerances occurring in the context of the winding of the stator body with regard to the conductor position in the circumferential or radial direction can thus at least largely be compensated, so that these tolerances cannot lead to strain of the contact bridge or its connections.

The opening may, in particular, penetrate or be adjacent to the respective contact surface which the section of the respective contact bridge abuts. If the section is accommodated in a recess, the opening can in particular open into this recess.

In principle, it is possible, that the conductor section of the winding, starting from a section of the winding which extends through a slot of the stator, extends rectilinearly in the axial direction. However, it may also be advantageous to guide the coil-forming conductor starting from the section guided through the slot initially radially outwards or inwards, in order to then guide it through the opening on a changed radial position axially away from the stator and in particular through the opening.

The respective contact bridge can be radially guided away from the respective conductor section of the winding. In particular, the contact bridge can overlap the housing and/or the insulation element.

At least one section of the contact bridge can be arranged on a side of a wall of the housing or of the insulation element facing away from the stator body in the axial direction of the electric machine. This can be implemented in that, starting from the stator slot, the conductor is guided radially inwards or outwards, which can lead it to the side of the wall facing away from the stator body. In particular, however, this can result from the fact that the conductor section of the respective winding, as explained above, is guided through an opening in the housing or the insulation element. Guiding it to the side of the wall facing away from the stator body can serve in particular to support the section, and thus the contact bridge at this wall. The wall can thus form the above-explained contact surface of the housing or of the insulation element.

The conductively connected conductor sections of the respective winding and contact bridge can extend in the axial direction beyond the housing and/or the insulation element. As already mentioned, the conductive connection may be established after the housing has already been arranged at the stator. By the axial projection of the conductor sections beyond the housing nevertheless easy access for tools, for example for welding the conductor sections, or, as will be explained below, a shortening of the conductor sections, is possible. Thus, the cost of producing the electric machine can be reduced.

The interconnected conductor sections of the respective winding and contact bridge can end at the same position in the axial direction of the electric machine and can be welded or soldered together at their axial end surfaces. Tolerances can, in the context of the manufacture of the electric machine, initially lead to the conductor sections ending at different positions in the axial direction. By shortening at least one of the conductor sections to be connected, however, it can be ensured that they end at the same position in the axial direction, which enables welding or soldering via the axial end surface. Additionally or alternatively, the conductor sections can be welded or soldered together at their end surfaces in the circumferential direction. As a result, typically much lower tolerances than in the axial direction are obtained in the circumferential direction, which, in addition, as explained above, can be compensated or at least reduced by a corresponding guide of the conductor section of the winding. The end surfaces are thus at least approximately in one plane in the circumferential direction and can thus be utilized for welding or soldering and thus for the conductive connection of the conductor sections.

The contact bridge or at least one of the contact bridges can be conductively connected to several windings of the same phase, in particular to all windings of the same phase. Alternatively, it would be possible to contact each of the windings via a separate contact bridge. A connection of a contact bridge to several windings may in particular be made in such a way that the axially extending conductor section of the contact bridge or a respective axially extending conductor section of the contact bridge is conductively connected to the axially extending conductor sections of the various windings, for example, as explained above, welded or soldered. For example, three parallel windings, which are contacted by a common contact bridge, can be provided for each of the phases.

The fixing section of the respective contact bridge can be screwed together with the housing and/or the current source and/or drain and/or the insulation element, and/or the insulation element can be screwed together with the housing and/or the power source and/or drain. In particular, the fixing section or the insulation element can have an opening through which a screw is guided, with which the screw connection is made. The screw can penetrate the fixing section or the insulation element, in particular in the axial direction of the electric machine.

The respective winding can be formed by several conductively interconnected conductor clamps which each form two slot sections guided through a respective slot of the stator body and a coupling section connecting the slot sections, the conductor clamps being connected by bending respective free ends of the conductor clamps in the circumferential direction of the electric machine and are each conductively connected with a free end of a further conductor clamp. The windings can thus be constructed in a hairpin design.

In addition to the electric machine, embodiments of the invention also relate to a motor vehicle comprising an electric machine. In particular, the electric machine can be a drive motor. For example, it can also be operated as a generator as part of a recuperation operation. The electric machine can, however, also be utilized as another motor, for example as an adjustment actuator for adjusting a component of the motor vehicle.

In addition, embodiments of the invention comprise a method for making electrical contact with at least one winding of at least one phase of a stator of an electric machine, comprising the steps:
- providing a stator comprising a stator carrying the at least one respective winding of the at least one phase, wherein the respective winding ends in a conductor section which extends away from the stator body in the axial direction of the electric machine;
- arranging the stator in a housing and arranging at least one contact bridge or an insulation element bracing a fixing section of the contact bridge at the housing or a current source and/or drain arranged at the housing in such a way that the fixing section of the contact bridge is in an installation position predetermined with respect to the housing, a respective additional conductor section, in which the respective contact bridge ends, extending in the axial direction of the electric machine away from the stator body; and then
- establishing a conductive connection between the winding of the respective phase or at least one of the windings of the respective phase and a respective contact bridge, by conductively connecting the conductor section of this winding to the further conductor section of this contact bridge,
- wherein, before or after establishing the conductive connection, the fixing section of the respective contact bridge is fixed stationarily in the installation position by fixing the fixing section or the insulation element, on the one hand, at the housing itself, and/or, on the other hand, to the power source and/or drain, which, in turn, is fixed to the housing.

The method may achieve the advantages already explained for the electric machine, in particular that a strain of the contact bridge or its connections can be avoided and the electric machine produced can thus have a longer service life. The method can be developed further with the features explained for the electric machine and with the advantages mentioned there, and vice versa.

In this context, in particular, the explained relative arrangements of housing, contact bridge, insulation element and stator body or the conductor sections of the windings of the stator body can already exist before the conductive connections are made. Specifically, even before establishing the conductive connection, the section of the respective contact bridge can abut a respective contact surface of the housing or insulation element or be accommodated in a recess of the housing or insulation element. Additionally or alternatively, the conductor section of the respective winding can be guided through the opening of the housing or insulation element in the axial direction before the conductive connection is established. Regardless, even before the conductive connection is established, the section of the contact bridge can be arranged on a side of the wall of the housing or insulation element facing away from the stator in the axial direction of the electric machine and/or, even before the conductive connection is established, the conductor sections of the respective winding and contact bridge can extend in the axial direction beyond the housing or insulation element.

In particular, the method can be used in the context of a method for producing an electric machine, in particular the electric machine described herein. Introducing the windings in the stator can be carried out in a preliminary step before the start of the method described herein, however, it may also be carried out as part of the method described herein. The introduction of the windings in the stator may in particular take place as explained above in the context of the hairpin design.

After arranging the at least one contact bridge or the insulation element at the housing or the power source and/or drain and before establishing the conductive connection, the conductor section and/or the further conductor section of at least one pair of conductor section and further conductor section to be connected, can be shortened in such a way that they end at the same position in the axial direction of the electric machine. In this context, only that conductor section can be shortened which extends further away from the stator body in the axial direction, or both conductor sections can be shortened to a fixed length or fixed axial position. In particular, all pairs of conductor sections to be connected can be shortened to the same length or in such a way that they extend up to the same axial position. This can reduce both the mechanical effort to shorten the conductor sections and the mechanical effort of connecting, thus, for example, of welding or soldering.

The conductor section and the further conductor section can be welded or soldered together at their axial end surfaces, and/or welded or soldered together at their end surfaces in the circumferential direction. This has already been explained above.

BRIEF DESCRIPTION OF THE SEVERAL VIEWS OF THE DRAWINGS

Further advantages and details of embodiments of the invention emerge from the description below and the associated drawings.

FIG. 1 shows an electric machine 1 that comprises a rotor 2 and a stator 3. Of the rotor 2, only the rotor shaft 4 can be seen in FIG. 1. The stator 3 comprises a stator body 5, typically a stack of sheets, which carries at least one respective winding 6 of at least one phase of the electric machine. The winding 6 is connected to a current source and/or drain 8 via a contact bridge 7, for example with an inverter or, in the case of a generator operation, with a rectifier. For reasons of clarity, only the contact element 28 of the current source or drain 8 is illustrated. The contacting of the winding 6 via the contact bridge 7 is initially only explained for a single winding 6 and illustrated in the figures. The contacting of several windings of several phases will be explained below with reference to FIG. 3.

Figure 1:
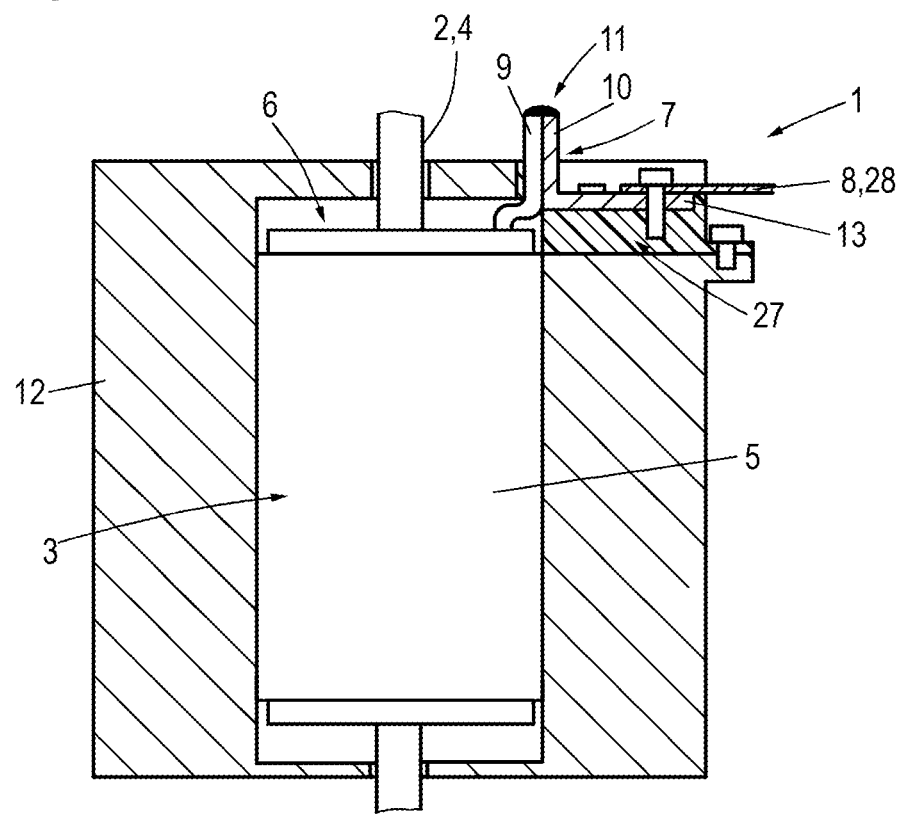
FIG. 1 shows a sectional view of an embodiment of an electric machine.

The winding 6 and the contact bridge 7 each end in a conductor section 9, 10 which extends away from the stator body 5 in the axial direction of the electric machine. A fixing section 13 of the contact bridge 7 is arranged in a stationary manner with respect to a housing 12 accommodating the stator 3, by being fixed, in the example screwed, in the example shown via an insulation element 27 to the housing 12 itself and also to the power source and/or drain 8. As will be explained in more detail below with reference to FIG. 2, such contacting of the winding 6 makes it possible to largely avoid tolerances in the context of manufacture, which could lead to strain in the components involved in the contacting.

To produce the machine illustrated in FIG. 1, the windings 6 are first introduced into slots of the stator carrier 5, each of which is limited by two stator teeth 15. This can be done, for example, by the hairpin design already explained above. In particular, the sections of the conductors shown in FIG. 2 can be the free ends of such a hairpin or such a conductor clamp. As already explained above, they are typically bent in the circumferential direction in order to contact further conductor clamps or hairpins, which is not shown in FIG. 2 for reasons of clarity.

When the stator 3 is introduced into the housing 12, the conductor section 9 of the winding 6, via which the contact is to be made, can be guided through an opening 14 in the housing 12 or the insulation element 27. Thereby, the conductor section 9 can be guided through the housing 12 or the insulation element 27 in such a way that its position in the circumferential and radial direction relative to the housing is substantially fixed, thus deviations occurring in the context of the manufacture of the stator can be compensated. Before or after the introduction of the stator 3 into the housing 12, a contact bridge 7 can be arranged at the housing 12 for the respective winding 6 to be contacted or for each of the phases.

In order to avoid a short circuit between different contact bridges 7 when a conductive housing 12 is used, the insulation element 27 can be used. In particular, a fixing section 13 of the contact bridge 7 can initially be braced at the insulation element 27, which is then fixed to the housing 12. In the example, the contact bridge 7 or its fixing section 13 is braced in a stationary manner in the recess 18 of the insulation element by the projection 30 and a latching lug 29 of the insulation element.

In order to specify the installation position of the contact bridge 7 or the fixing section 13, via which the fixing takes place, even before connecting the conductor sections 9, 10 and particularly before fixing the contact bridge 7 to the contact element 28 of the power source and/or drain 8, which takes place via the screw 31 in the example, with good accuracy, a section of the contact bridge 7, which comprises the fixing section 13, is inserted into a recess 18 of the insulation element 27 and abuts a contact surface 17 of the insulation element 27. The contact bridge 7 is thus arranged on a side of a wall 16 of the insulation element 27 facing away from the stator body 5 in the axial direction of the electric machine 1. In the example, the insulation element 27 is fixed to the housing 12 via the screw 19, in order to set the relative position of the insulation element 27 and housing 12 with good accuracy.

Figure 2:
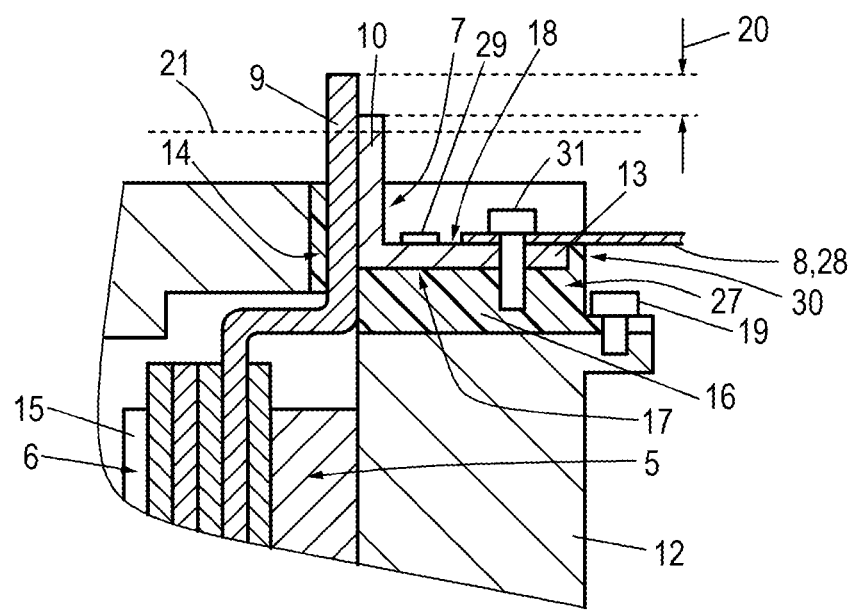
FIG. 2 shows a detailed view of the electric machine shown in FIG. 1.

Tolerances within the context of the construction of the electric machine can in particular lead to the axial positions of the ends of the conductor sections 9, 10 varying. As a result, they may not end at the same axial position, so that their ends are at a distance 20. Since the conductor sections 9, 10, as illustrated in FIGS. 1 and 2, however, extend parallel in the axial direction of the electric machine, tolerances can be compensated for without any problems in that the conductive connection is only made after the contact bridge 7 or the fixing section 13 has been placed in the installation position or was fixed there. In this case, the conductive connection can take place, for example, in that the conductor sections 9, 10 are welded or soldered together at their end faces in the circumferential direction.

However, especially if a relatively large number of phases or windings are to be contacted, as will be explained below with reference to FIG. 3, it can be advantageous to implement the conductive connection by welding or soldering via the axial end surfaces 11. For this purpose, one of the conductor sections 9, 10 can be shortened in such a way that the conductor sections 9, 10 end at the same position in the axial direction of the electric machine 1. However, it can be particularly easier to separate all of the conductor sections 9, 10 of the electric machine to be used at a fixed axial position 21 in order, for example, to only have to move a soldering or welding tool in use in one plane.

Figure 3:
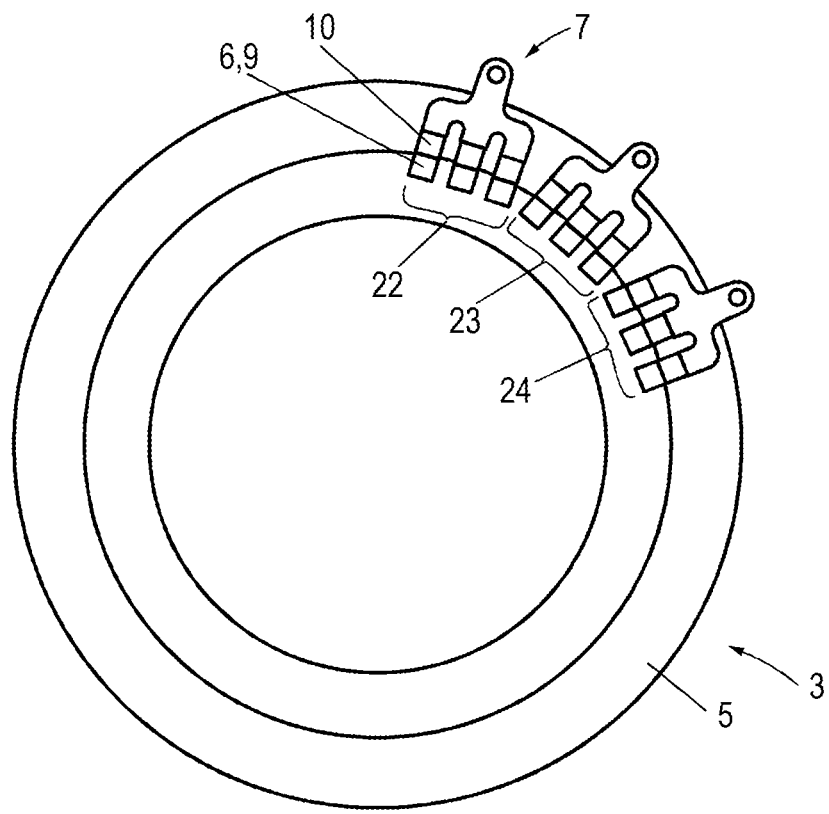
FIG. 3 shows a plan view of a stator of a further embodiment of an electric machine.

FIG. 3 shows a plan view of a stator 3 of a further embodiment of an electric machine. Apart from the contact bridges 7, the other components of the electric machine are not illustrated for reasons of clarity. In the stator 3, the stator body 5 carries three parallel windings 6 each for three phases 22, 23, 24. Each of the windings 6 ends, as already explained above for an individual winding 6, in a respective conductor section 9 which extends away from the stator body 5 in the axial direction. A respective contact bridge 7 is provided for each of the phases 22, 23, 24, each having three conductor sections 10 spaced apart in the circumferential direction of the electric machine, which likewise extend away from the stator body 5 in the axial direction of the electric machine. For each of the phases 22, 23, 24, three pairs of a conductor section 9 of the respective winding 6 and a respective conductor section 10 of the respective contact bridge 7 are thus conductively connected, for example welded or soldered as explained above. Thus, several windings of several phases can be contacted with little effort, with the above-mentioned advantages with respect to the tolerance compensation and thus avoiding a strain of the components utilized for contacting is achieved.

Figure 4:
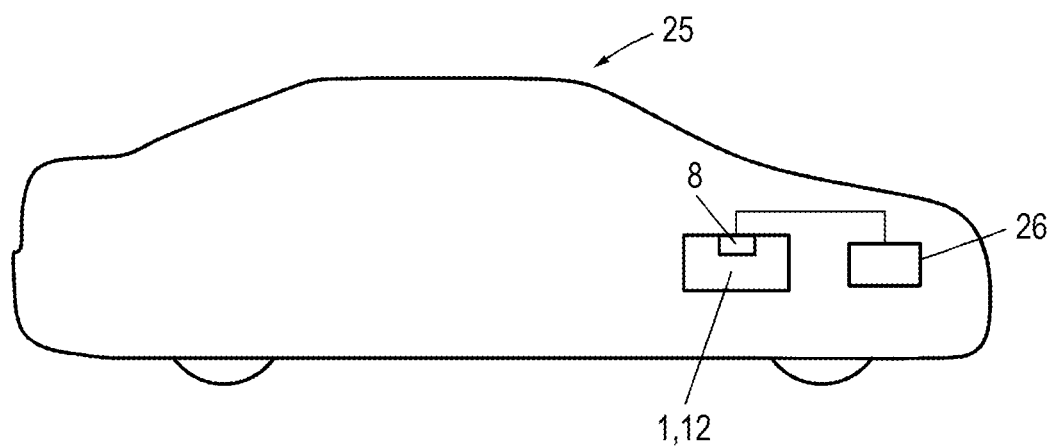
FIG. 4 shows an embodiment of a motor vehicle.

FIG. 4 shows a motor vehicle 25 which comprises the electric machine 1 discussed with reference to FIGS. 1 and 2 or the electric machine 1 discussed with reference to FIG. 3. In this case, the current source or drain 8 is an inverter, by means of which current of an energy storage system 26, for example a battery, is provided to the electric machine 1, to drive the motor vehicle 25.

German patent application no. 10 2019 133674.0, filed Dec. 10, 2019, to which this application claims priority, is hereby incorporated herein by reference, in its entirety.

In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. An electric machine, comprising:
   a rotor; and
   a stator;
   wherein the stator comprises a stator body which carries at least one respective winding of at least one phase,
   wherein the at least one respective winding of the at least one phase is conductively connected to a respective contact bridge, which connects the at least one respective winding to a power source and/or a drain;
   wherein each end of the at least one respective winding and the respective contact bridge connected to the at least one respective winding having a conductor section which extends away from the stator body in an axial direction of the electric machine, and the conductor sections of the at least one respective winding and the respective contact bridge are conductively connected to one another; and
   wherein a fixing section of the respective contact bridge is arranged stationary with respect to a housing accommodating the stator by being fixed, by an insulation element or directly, to the housing and/or to the power source and/or the drain, which is fixed to the housing;
   wherein the conductor section of the at least one respective winding extends in the axial direction through an opening of the housing and/or the insulation element and is conductively connected to the conductor section of the respective contact bridge on a side of the opening facing away from the stator body;
   wherein the opening extends completely through the housing such that the ends of the at least one respective winding and the respective contact bridge are outside of the housing.

2. The electric machine according to claim 1, wherein at least a section of the respective contact bridge abuts at least a respective contact surface of the housing and/or the insulation element and/or is accommodated in a recess of the housing and/or the insulation element.

3. The electric machine according to claim 1, wherein at least one section of the respective contact bridge is arranged on a side of a wall of the housing or of the insulation element facing away from the stator body in the axial direction of the electric machine.

4. The electric machine according to claim 1, wherein the conductor sections of the at least one respective winding and respective contact bridge extend beyond the housing and/or the insulation element in the axial direction.

5. The electric machine according to claim 1, wherein the conductor sections of the at least one respective winding and respective contact bridge end at the same position in the axial direction of the electric machine and are welded or soldered together at their axial end surfaces and/or are welded or soldered together at their end surfaces in a circumferential direction.

6. The electric machine according to claim 1, wherein the respective contact bridge is connected conductively with several windings of the same at least one phase.

7. A motor vehicle including an electric machine, comprising:
   a rotor; and
   a stator,
   wherein the stator comprises a stator body which carries at least one respective winding of at least one phase,
   wherein the at least one respective winding of the at least one phase or is conductively connected to a respective contact bridge, which connects the at least one respective winding to a power source and/or drain,
   wherein each end of the at least one respective winding and the respective contact bridge connected to the at least one respective winding having a conductor section which extends away from the stator body in an axial direction of the electric machine, and the conductor sections of the at least one respective winding and the respective contact bridge are conductively connected to one another,
   wherein a fixing section of the respective contact bridge is arranged stationary with respect to a housing accommodating the stator by being fixed, by an insulation element or directly, to the housing and/or to the power source and/or drain, which is fixed to the housing;
   wherein the conductor section of the at least one respective winding extends in the axial direction through an opening of the housing and/or the insulation element and is conductively connected to the conductor section of the respective contact bridge on the side of the opening facing away from the stator body;
   wherein the opening extends completely through the housing such that the ends of the at least one respective winding and the respective contact bridge are outside of the housing.

8. A method for making electrical contact with at least one respective winding of at least one phase of a stator of an electric machine, the method comprising:
   providing the stator carrying the at least one respective winding of the at least one phase, wherein the at least one respective winding ends in a conductor section which extends away from the stator body in an axial direction of the electric machine;
   arranging the stator in a housing and arranging at least one contact bridge or an insulation element bracing a fixing section of the at least one contact bridge at the housing or a current source and/or drain arranged at the housing such that the fixing section of the at least one contact bridge is in an installation position predetermined with respect to the housing, a respective additional conductor section, in which the at least one contact bridge ends, extending in the axial direction of the electric machine away from the stator body; and, then
   establishing a conductive connection between the at least one respective winding of the at least one phase and the at least one contact bridge, by conductively connecting the conductor section of the at least one respective winding to the additional conductor section of the at least one contact bridge, such that the conductor section of the at least one respective winding extends in the axial direction through an opening of the housing and/or the insulation element and is conductively connected to the conductor section of the at least one contact bridge on the side of the opening facing away from the stator body, wherein the opening extends completely through the housing such that ends of the at least one respective winding and the at least one contact bridge are outside of the housing;
   wherein, before or after establishing the conductive connection, the fixing section of the at least one contact bridge is fixed stationary in the installation position by fixing the fixing section or the insulation element at the housing and/or to a power source and/or drain, which is fixed to the housing.

9. The method according to claim 8, wherein, after the arrangement of the respective contact bridge or the insulation element at the housing or the current source and/or drain, and before establishing the conductive connection, the conductor section and/or the additional conductor section of at least one pair of conductor section and a additional conductor section to be connected, is shortened in such a way that they end at the same position in the axial direction of the electric machine.

10. The method according to claim 8, wherein the conductor section and the additional conductor section are welded or soldered together at their axial end surfaces and/or are welded or soldered together at their end surfaces in the circumferential direction.

\* \* \* \* \*

UNITED STATES PATENT AND TRADEMARK OFFICE
CERTIFICATE OF CORRECTION

Page 1 of 1

PATENT NO. : 11,777,357 B2
APPLICATION NO. : 17/116909
DATED : October 3, 2023
INVENTOR(S) : Korbinian Weber et al.

It is certified that error appears in the above-identified patent and that said Letters Patent is hereby corrected as shown below:

In the Claims

Column 9, Claim 6, Line 61:
"of the same at least one phase." should read: --of the at least one phase.--

Signed and Sealed this
Fifteenth Day of April, 2025

Coke Morgan Stewart
*Acting Director of the United States Patent and Trademark Office*